United States Patent
Farooq et al.

(10) Patent No.: US 12,208,763 B1
(45) Date of Patent: Jan. 28, 2025

(54) ARMREST MOUNTED DUAL CHAMBER AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/360,154

(22) Filed: Jul. 27, 2023

(51) Int. Cl.
| | |
|---|---|
| *B60R 21/207* | (2006.01) |
| *B60R 21/233* | (2006.01) |
| *B60N 2/02* | (2006.01) |
| *B60N 2/75* | (2018.01) |
| *B60R 21/231* | (2011.01) |
| *B60R 21/261* | (2011.01) |

(52) U.S. Cl.
CPC .......... *B60R 21/207* (2013.01); *B60R 21/233* (2013.01); *B60N 2/02246* (2023.08); *B60N 2/767* (2018.02); *B60R 2021/23146* (2013.01); *B60R 2021/2612* (2013.01)

(58) Field of Classification Search
CPC ................ B60R 21/207; B60R 21/233; B60R 2021/23146; B60R 2021/2612; B60N 2/767; B60N 2/02246

See application file for complete search history.

(56) References Cited

U.S. PATENT DOCUMENTS

| | | | | |
|---|---|---|---|---|
| 5,492,361 | A * | 2/1996 | Kim ...................... | B60R 21/207 280/730.2 |
| 5,730,458 | A * | 3/1998 | Byon ....................... | B60N 2/79 280/730.2 |
| 9,738,188 | B2 | 8/2017 | Honda et al. | |
| 10,081,326 | B2 * | 9/2018 | Koike ..................... | B60N 2/753 |
| 10,272,865 | B2 * | 4/2019 | Nagasawa ............... | B60R 21/18 |
| 10,569,732 | B2 * | 2/2020 | Nagasawa ............. | B60R 21/207 |
| 10,723,249 | B2 * | 7/2020 | Dry ......................... | B60N 2/753 |
| 11,110,881 | B1 * | 9/2021 | Deng ................... | B60R 21/207 |
| 11,254,248 | B1 * | 2/2022 | Line ....................... | B60N 2/767 |
| 11,273,785 | B1 | 3/2022 | Faruque et al. | |
| 11,305,679 | B2 | 4/2022 | Lee et al. | |
| 11,370,376 | B2 * | 6/2022 | Deng ........................ | B60N 2/79 |
| 11,390,235 | B2 * | 7/2022 | Kim ................... | B60R 21/2338 |
| 11,541,840 | B2 * | 1/2023 | Jaradi ................... | B60R 21/264 |
| 11,603,068 | B2 * | 3/2023 | Kawamura ........... | B60R 21/207 |
| 11,608,020 | B1 * | 3/2023 | Wheelwright ......... | B60N 2/753 |
| 11,634,098 | B1 | 4/2023 | Line et al. | |
| 11,851,020 | B1 * | 12/2023 | Deng ................ | B60R 21/23138 |

(Continued)

FOREIGN PATENT DOCUMENTS

AU 724195 B2 * 1/1998 ............. B60R 21/20

*Primary Examiner* — Toan C To
(74) *Attorney, Agent, or Firm* — Frank A. Mackenzie; Brooks Kushman P.C.

(57) ABSTRACT

A vehicle seat includes a seatback and an armrest coupled to the seatback. An airbag is positioned in the armrest and is inflatable from an uninflated position to an inflated position. The airbag includes a first chamber positioned to extend downward from the armrest and a second chamber positioned to extend upward from the armrest when the airbag is in the inflated position.

19 Claims, 5 Drawing Sheets

(56) References Cited

U.S. PATENT DOCUMENTS

| | | | |
|---|---|---|---|
| 2007/0052219 A1* | 3/2007 | Rust | B60R 21/0428 |
| | | | 280/751 |
| 2011/0278826 A1* | 11/2011 | Fukawatase | B60R 21/231 |
| | | | 280/730.2 |
| 2014/0151984 A1* | 6/2014 | Fukawatase | B60R 21/23138 |
| | | | 280/730.2 |
| 2017/0015271 A1* | 1/2017 | Paxton | B60R 21/239 |
| 2017/0072893 A1* | 3/2017 | Fujiwara | B60N 2/753 |
| 2018/0281724 A1* | 10/2018 | Nagasawa | B60R 21/207 |
| 2018/0281725 A1 | 10/2018 | Nagasawa | |
| 2019/0092264 A1 | 3/2019 | Spahn et al. | |
| 2020/0317155 A1* | 10/2020 | Deng | B60R 21/23138 |
| 2023/0062306 A1* | 3/2023 | Wheelwright | B60R 21/207 |
| 2023/0091680 A1* | 3/2023 | Lee | B60N 2/773 |
| | | | 297/411.32 |
| 2023/0128759 A1* | 4/2023 | Deng | B60R 21/2338 |
| | | | 280/743.2 |

* cited by examiner

ARMREST MOUNTED DUAL CHAMBER AIRBAG

BACKGROUND

Vehicles are equipped with airbag assemblies that include an airbag and an inflator. In the event of certain vehicle impacts, the inflator activates and provides inflation medium to the airbag. This pressurizes the airbag to control the kinematics of an occupant during certain vehicle impacts. The airbag assemblies may be located at various positions in the passenger compartment of the vehicle. Vehicles may include airbags supported on a dash, side air curtains mounted to roof rails, seat-mounted airbag, etc.

DETAILED DESCRIPTION

Figure 1:
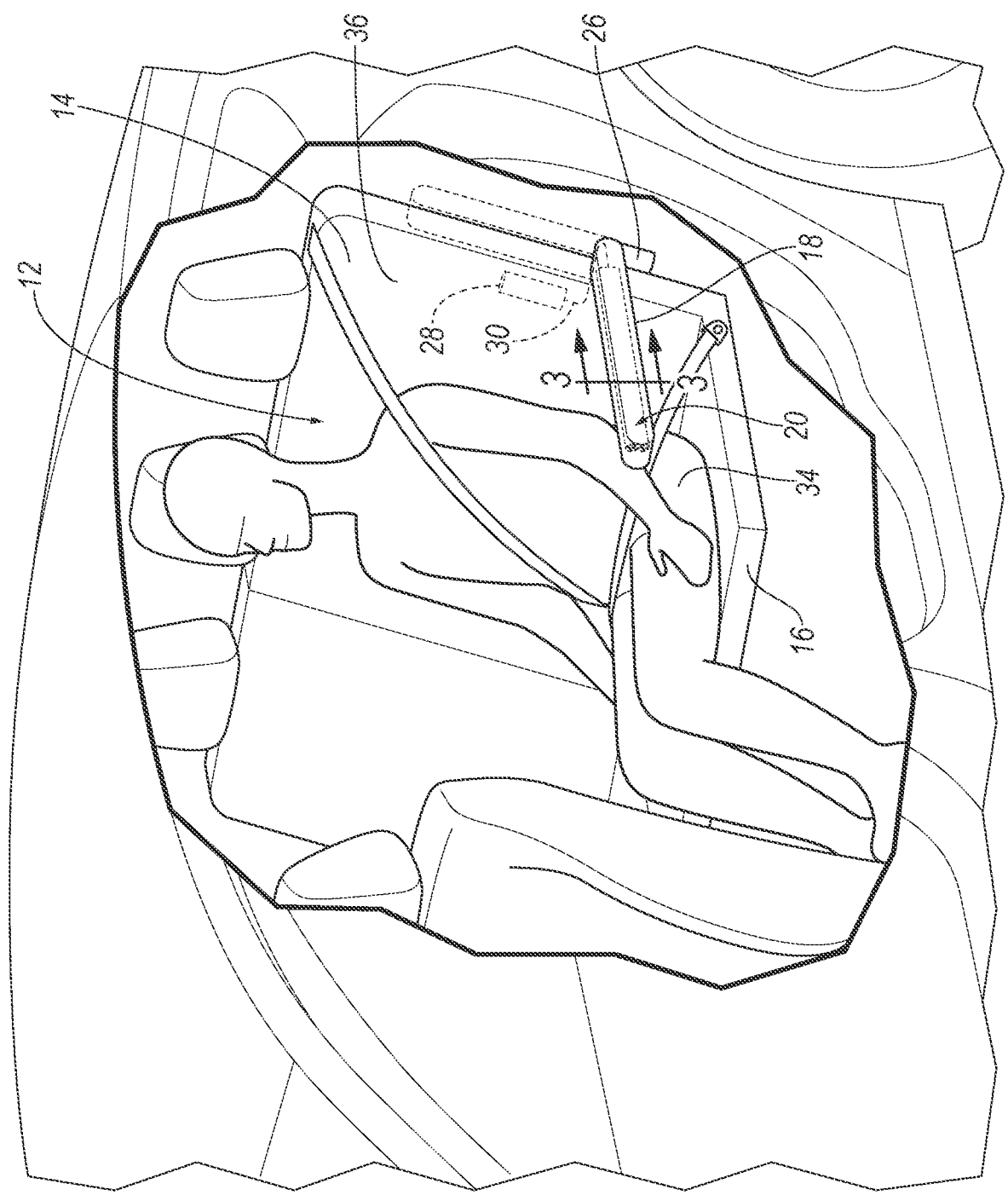
FIG. 1 is a perspective view of a vehicle with a seat in a rear row having an armrest in a down position and an airbag in an uninflated position.

A vehicle seat includes a seatback and an armrest coupled to the seatback. An airbag is positioned in the armrest and is inflatable from an uninflated position to an inflated position. The airbag includes a first chamber positioned to extend downward from the armrest and a second chamber positioned to extend upward from the armrest when the airbag is in the inflated position.

The armrest may be rotatably coupled to the seatback. The vehicle seat may include an actuator coupled to the armrest and operative to automatically move the armrest to a down position. The actuator may be a motor and a worm gear.

The first chamber and the second chamber may at least partially overlap with each other when in the inflated position. At least one of the first chamber and the second chamber may include at least one vent. The first chamber and the second chamber may be rolled in the uninflated position.

The vehicle seat may include an inflator fixed to the seatback and in fluid communication with the airbag. The vehicle seat may include a fill tube extending from the inflator to the airbag.

A vehicle seat includes a seat bottom defining an occupant leg area and a seatback supported by the seat bottom and defining an occupant torso area. An armrest is coupled to the seatback, and an airbag is positioned in the armrest and inflatable from an uninflated position to an inflated position. The airbag includes a first chamber positioned to extend downward from the armrest between the occupant leg area and the armrest and a second chamber positioned to extend upward from the armrest adjacent to the occupant torso area when the airbag is in the inflated position. The armrest may be rotatably coupled to the seatback and may include an actuator coupled to the armrest that is operative to automatically move the armrest to a down position. The actuator may be a motor and a worm gear. The vehicle seat may include an inflator in fluid communication with both the first chamber and the second chamber that is operative to fill both the first chamber and the second chamber.

With reference to the Figures, wherein like numerals indicate like parts throughout the several views, a vehicle 10 includes a vehicle seat 12 having a seatback 14, a seat bottom 16, and an armrest 18 coupled to the seatback 14. An airbag 20 is positioned in the armrest 18 and is inflatable from an uninflated position (FIG. 1) to an inflated position (FIG. 2). The airbag 20 includes a first chamber 22 positioned to extend downward from the armrest 18 and a second chamber 24 positioned to extend upward from the armrest 18 when the airbag 20 is in the inflated position.

Having an airbag 20 with a first (e.g., lower) chamber 22 and a second (e.g., upper) chamber 24, allows airbag stiffness to be selectively adapted using vents 32 in the lower and upper chambers 22 and 24, respectively, to account for different stiffness needs of torso/thigh and head/neck/shoulder regions of the body. Having two chambers also allows the first chamber 22 and the second chamber 24 to partially overlap with each other when in the inflated position to help prevent contact with the armrest 18. The rolled airbag 20 packaged in the armrest 18 frees up space in the seatback 14 for other purposes.

The armrest 18 may be rotatably coupled to the seatback 14 and movable between an up or stowed position (shown in phantom) and a down or user position. The seat 12 may include an actuator 26 coupled to the armrest 18 that is operative to automatically move the armrest 18 to the down position. The actuator 26 may be a motor and a worm gear. When the presence of an occupant is detected, the actuator 26 is activated to move the armrest 18 to the down position if not already in the down position. The armrest 18 is locked in the down position by virtue of the worm gear arrangement. When it is determined that the occupant is exiting the vehicle, the armrest 18 is unlocked so that the armrest 18 can be manually moved to the up position to facilitate egress/ingress of the occupant.

Figure 2:
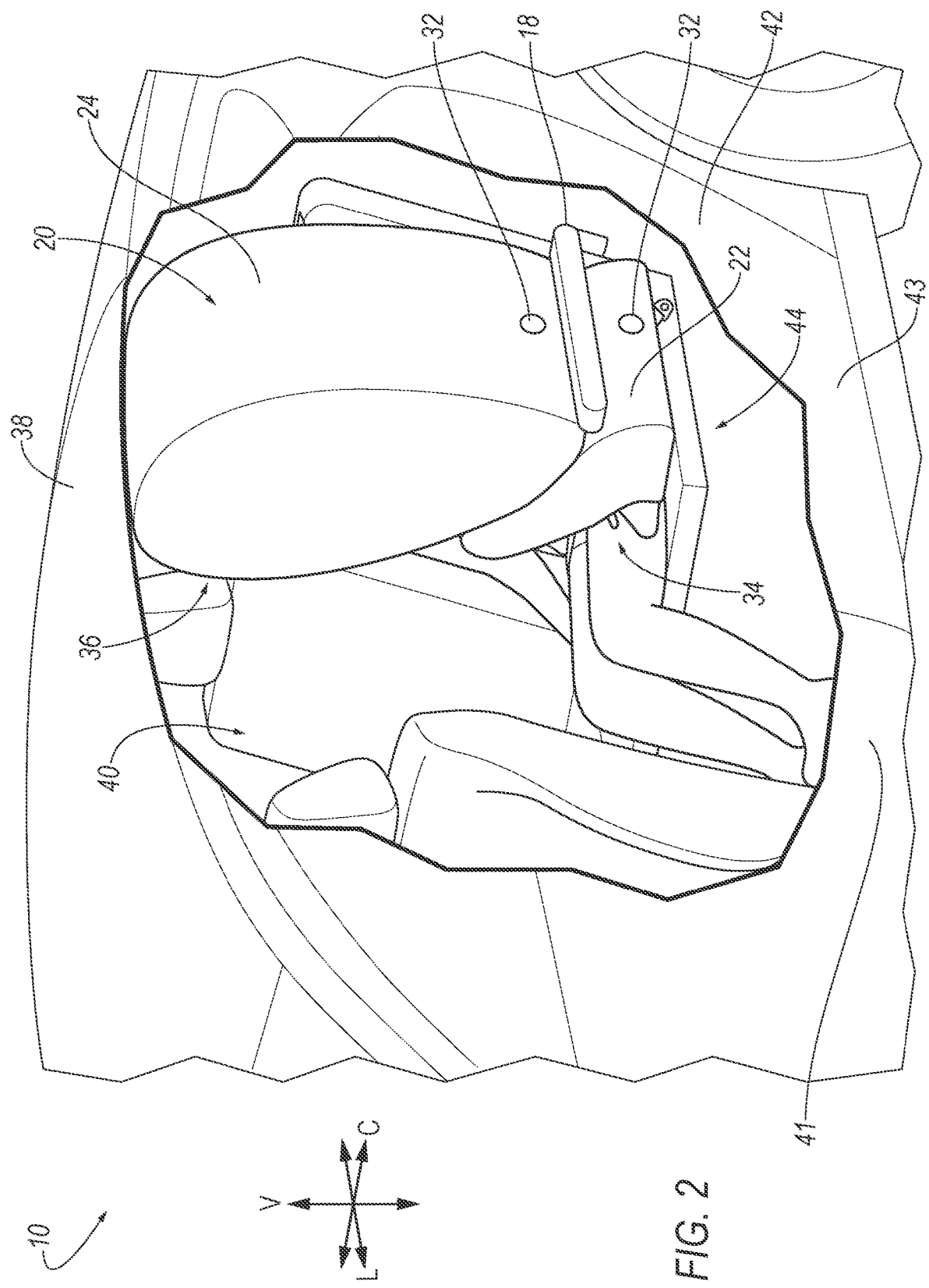
FIG. 2 is a perspective view of the vehicle with the airbag in an inflated position.

With reference to FIG. 1, the vehicle seat 12 may include an inflator 28 fixed to the seatback 14 and in fluid communication with the airbag 20. The inflator 28 may be fixed to the seatback 14, e.g., the seatback frame, in any suitable way, e.g., threaded fastener, bracket, etc. The vehicle seat 12 may include a fill tube 30 extending from the inflator 28 to the airbag 20. The inflator 28 may be in fluid communication with both the first chamber 22 and the second chamber 24 and operative to fill both the first chamber 22 and the second chamber 24. In other words, one or more fill tubes can connect to the chambers to introduce gas to the first, second, or both chambers. The fill tube 30 may be coiled to allow for the up and down movement of the armrest 18.

In response to certain vehicle impacts the airbag 20 inflates relative to an occupant seating area of the vehicle seat 12. The occupant seating-area is the space occupied by an occupant properly seated on the seat. The occupant-seating area is vehicle-forward of the seatback 14 and above and vehicle-forward of the seat bottom 16. For example, the seat bottom 16 defines an occupant leg area 34 and the seatback 14 defines an occupant torso area 36. The inflator 28 expands the airbag 20 with inflation medium, such as a gas, to move the airbag 20 from the uninflated position to the inflated position. The inflator 28 may be, for example, a pyrotechnic inflator that ignites a chemical reaction to generate the inflation medium, a stored gas inflator that releases e.g., by a pyrotechnic valve stored gas as the inflation medium, or a hybrid.

In some examples, the seat 12 may include an armrest actuator 26 operatively coupled to the armrest 18 to move the armrest 18 from the stowed position to the user position. The actuator 26 may be of any suitable type to move the armrest 18 from the stowed position to the user position and from the user position to the stowed position. As mentioned above, the actuator 26 may be a motor and a worm drive arrangement as is known in the art. For example, a worm wheel can be positioned on the armrest 18 and the motor can drive a worm screw meshed with the worm wheel. Worm drives are typically self-locking. In other words, the worm wheel cannot drive the worm gear. Accordingly, the armrest 18 can be locked in position (e.g., the down position) where the motor stops driving the worm gear. The worm drive arrangement can be unlocked to allow a user to move the armrest 18 between the up and down positions. For example, the worm wheel can be coupled to the armrest 18 with a releasable clutch mechanism. When the clutch mechanism is disengaged, the armrest 18 may be moved manually.

In order to facilitate proper deployment of the airbag 20, the armrest 18 can be locked in the down position when a seated occupant is seated on the seat 12. In this document, "seated occupant" refers to a properly seated occupant seated directly on the vehicle seat. The armrest 18 may be in the up position when no seated occupant is detected on the seat 12 (e.g., when no occupant is seated on the seat 12, when an occupant is becoming seated on the seat 12, when an occupant is exiting the seat 12, and/or when a child restraint system (not shown) is identified on the seat 12 thus preventing possibility of an occupant properly seated directly on the seat). The armrest 18 may be in the up position to allow an occupant to become seated in the seat 12 or to allow an occupant to exit the seat 12. The armrest 18 remains in the up position when a child restraint system is identified in the seat 12. Specifically, the vehicle 10 may identify a child restraint system using an occupant classification system, sensors, cameras, weight sensors, a combination thereof, or any other suitable way of identifying the child restraint system. Described further below, an occupancy sensor 50 may identify the child restraint system.

With reference to FIG. 2, the first chamber 22 and the second chamber 24 may at least partially overlap with each other when in the inflated position. At least one of the first chamber 22 and the second chamber 24 may include at least one vent 32. The vents 32 can be added to the upper and/or lower chambers of the airbag 20 to selectively control the stiffness/deflation characteristics for the occupant leg area 34 and the occupant torso area 36. The first chamber 22 is positioned to extend downward from the armrest 18 between the occupant leg area 34 and the armrest 18 and the second chamber 24 is positioned to extend upward from the armrest 18 adjacent to the occupant torso area 36 when the airbag 20 is in the inflated position. Accordingly, the airbag 20 is positioned between rear door 43 and the occupant seating area, e.g., occupant leg area 34 and occupant torso area 36.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 includes a vehicle body. The vehicle body may be of a unibody construction, a body-on-frame construction, or any suitable construction. In the unibody construction, the vehicle body serves as a frame, and the vehicle body (includes the rockers, pillars, roof rails, etc.) is unitary, i.e., a continuous one-piece unit. As another example, in body-on-frame construction (also referred to as a cab-on-frame construction), the vehicle body and frame are separate components, i.e., are modular, and the vehicle body is supported on and affixed to the frame. In other examples, the vehicle body may have any suitable construction. The vehicle body may be of any suitable material, for example, steel, aluminum, etc.

The vehicle body includes a vehicle roof 38, vehicle pillars, body panels, a vehicle floor, etc. The vehicle body defines a passenger compartment 40 to house occupants, if any, of the vehicle 10. The passenger compartment 40 may extend across the vehicle 10, i.e., from one side to the other side of the vehicle 10. The passenger compartment 40 includes a front end and a rear end with the front end being in front of the rear end during forward movement of the vehicle 10.

The vehicle 10 defines a vehicle-longitudinal axis L extending between a front end (not numbered) and a rear-end (not numbered) of the vehicle 10. The vehicle 10 defines a cross-vehicle axis C extending cross-vehicle from one side to the other side of the vehicle 10. The vehicle 10 defines a vertical axis V extending through a vehicle floor and the vehicle roof 38. The vehicle-longitudinal axis L, the cross-vehicle axis C, and the vertical axis V are perpendicular relative to each other.

The vehicle roof 38 and the vehicle floor are spaced from each other. Specifically, the vehicle floor is spaced below the vehicle roof 38. The vehicle roof 38 defines the upper boundary of the passenger compartment 40 and may extend from the front end of the passenger compartment 40 to the rear end of the passenger compartment 40. The vehicle roof 38 may include roof rails and a roof panel extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle floor defines the lower boundary of the passenger compartment 40 and may extend from the front end of the passenger compartment 40 to the rear end of the passenger compartment 40. The vehicle floor may include upholstery, for example, carpet, and may have a class-A surface facing the passenger compartment 40, i.e., a surface specifically manufactured to have a high quality, finished, aesthetic appearance free of blemishes.

The vehicle body includes a body side 42. Specifically, the vehicle body includes two body sides 42 spaced cross vehicle 10 from each other. The body side 42 is a side of the body located vehicle-outboard of the passenger compartment 40. The body sides 42 may be spaced from each other along the cross-vehicle axis C on opposite sides of the longitudinal axis L and may be elongated along the longitudinal axis L. The body side 42 includes one or more door openings. The vehicle floor extends from one body side 42 to the other body side 42 and the vehicle roof 38 extends from one body side 42 to the other body side 42. The body side 42 may include a rear-window opening adjacent a seatback 14 of a rear one of the vehicle seats 12.

The vehicle body, specifically each body side 42, may include pillars. In some examples, the pillars on the same body side 42 are separated by one of the door openings. For example, the vehicle body may include a rear pillar on each side of the vehicle 10. The rear pillar may extend between a liftgate and a rear door opening, and other pillars may be vehicle-forward of the rear pillars, e.g., between adjacent doors. The vehicle 10 may include any suitable number of pillars on either body side 42. The pillars may extend from the vehicle roof 38 to the vehicle floor. The vehicle 10 includes vehicle doors 41 and 43, openable for occupants to enter and exit the passenger compartment 40. In the example shown in the Figures, the vehicle 10 includes a front door 41 and a rear door 43 on each body side 42. The front door 41 is vehicle-forward of the rear door 43 along the longitudinal axis L of the vehicle 10.

The vehicle 10 may include one or more vehicle seats 12. Specifically, the vehicle 10 may include any suitable number of vehicle seats 12. The vehicle seats 12 are supported by the vehicle floor. The vehicle seats 12 may be arranged in any suitable arrangement in the passenger compartment 40. One or more of the vehicle seats 12 may be at the front end of the passenger compartment 40, e.g., a front row. One or more of the vehicle seats 12 may be behind the front end of the passenger compartment 40, e.g., at the rear end of the passenger compartment 40 as a rear row 44. In the example shown in the Figures, the vehicle 10 includes a rear row 44. The rear row 44 in the Figures may be, in some examples, a second row or a third row. The vehicle seats 12 may be of any suitable type, e.g., a bucket seat, bench seat, etc.

As set forth above, the seat includes the seatback 14 and the seat bottom 16. The vehicle seat 12 may include a head restraint at each occupant-seating area. The head restraint may be supported by and extends upwardly from the seatback 14. The head restraint may be stationary or selectively adjustable relative to the seatback 14 by an occupant.

The seatback 14 may be supported by the seat bottom 16 and may be foldable relative to the seat bottom 16 and/or reclinable relative to the seat bottom 16 or may be stationary relative to the seat bottom 16. The seatback 14 may extend from an upper end to a lower end. The lower end may be connected to the seat bottom 16. The upper end of the seatback 14 may be spaced upwardly from the lower end of the seatback 14, i.e., upwardly from the seat bottom 16. The head restraint may extend upwardly from the upper end of the seatback 14. The seatback 14, the seat bottom 16, and the head restraint may be adjustable in multiple degrees of freedom. Specifically, the seatback 14, the seat bottom 16, and the head restraint may themselves be adjustable. In other words, adjustable components within the seatback 14, the seat bottom 16, and the head restraint may be adjustable relative to each other.

The vehicle seat 12 includes a seat frame. The seat frame includes a seatback frame and a seat bottom frame, i.e., the seatback 14 includes the seatback frame and the seat bottom 16 includes the seat bottom frame. The seat frame may include panels and/or may include tubes, beams, etc. The seat frame may be of any suitable plastic material (e.g., carbon fiber reinforced plastic (CFRP), glass fiber-reinforced semi-finished thermoplastic composite (organosheet), etc.), a suitable metal (e.g., steel, aluminum, etc.), etc.

The vehicle seat 12 includes a covering supported on the seat frame. The covering may be cloth, leather, faux leather, or any other suitable material. The vehicle seat 12 may include padding material between the covering and the seat frame. The padding material may be foam or any other suitable material. The covering may be stitched in panels around the seat frame and padding material.

Figure 3:
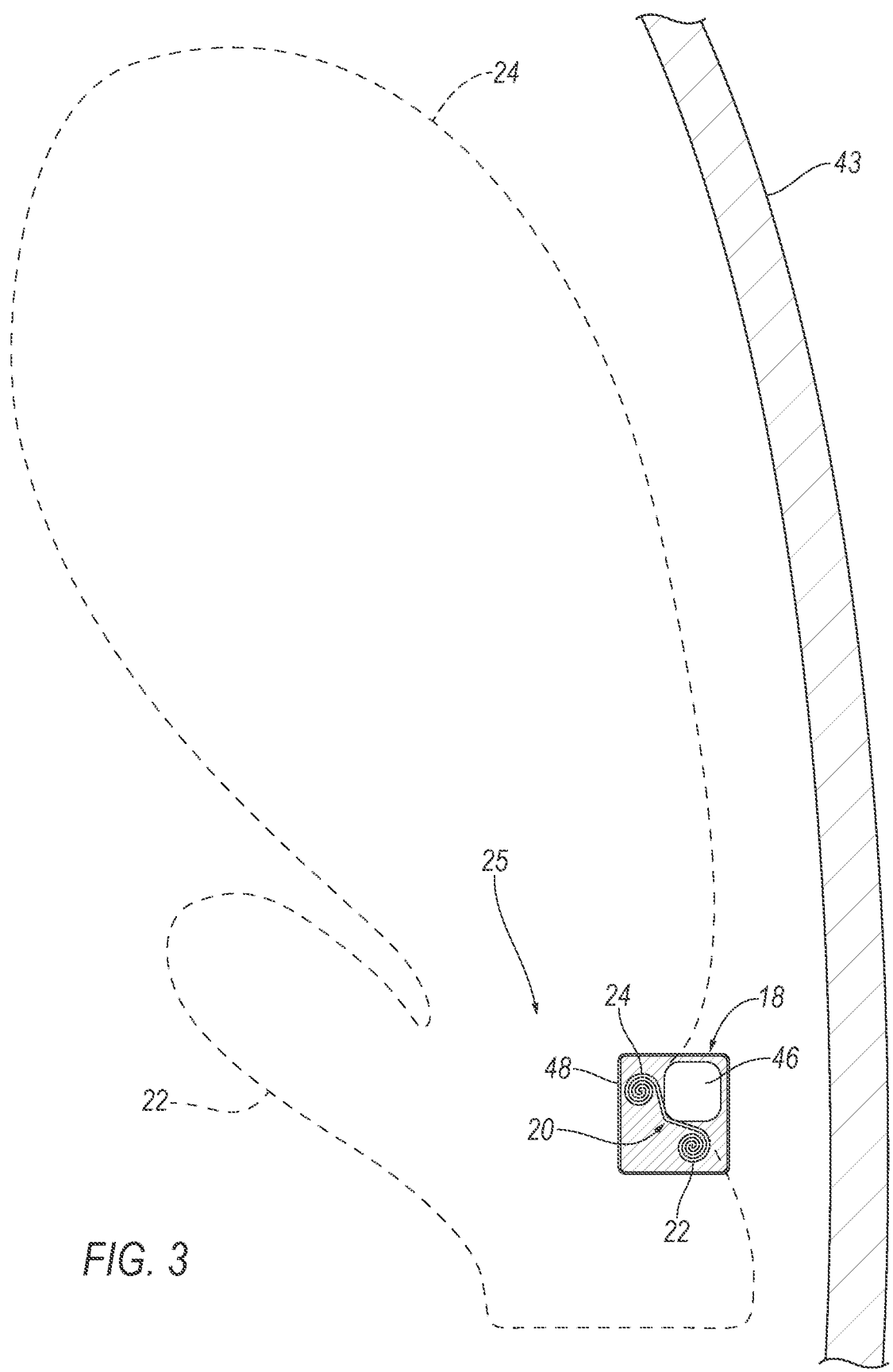
FIG. 3 is an end view in cross-section of the armrest and airbag.

With reference to FIG. 3, the armrest 18 includes an armrest frame 46. The airbag 20 is supported by the armrest frame 46. Specifically, the airbag 20 is supported along a length of the frame 46. In an example in which the airbag 20 includes a housing, the housing may be fixed directly to frame 46 of the armrest 18. The airbag 20 is supported by the armrest 18 in the uninflated position and in the inflated position. In other words, the weight of the airbag 20 is borne by the armrest 18 in the uninflated position and the inflated position. As an example, the first chamber 22 and the second chamber 24 may be rolled in the uninflated position as shown.

With continued reference to FIG. 3, when in the inflated position (shown in phantom), the airbag 20 contains a single volume with two chambers (i.e., first chamber 22 and second chamber 24) in fluid communication with each other via a narrow region 25. Narrow region 25 may be configured to selectively control the inflation/stiffness/deflation characteristics of the airbag chambers in addition to or in lieu of vents 32.

The airbag 20 may be concealed by a covering 48, e.g., the upholstery of the armrest 18. In other words, the airbag 20 may be between the frame 46 of the armrest 18 and the upholstery of the armrest 18. The covering 48 may include a tear seam (not numbered) associated with the airbag 20. The airbag 20 may extend through the tear seam as it inflates from the uninflated position to the inflated position. The tear seam may be designed to tear apart when subjected to a tensile force above a threshold magnitude. In other words, the covering 48 on one side of the tear seam separates from the covering 48 on the other side of the tear seam when the force is above the threshold magnitude. The threshold magnitude may be chosen to be greater than forces from, e.g., inadvertent pushing against the seat by an occupant but be less than forces from the deployment of the airbag 20. The tear seam may be, for example, a line of perforations through the covering 48, a line of thinner covering material than the rest of the covering 48, etc.

Although, examples are described with respect to armrests on the outboard side of a seat, armrest mounted airbags can also be applied to inboard armrests. Also, the disclosed armrest mounted airbags are applicable to captain's chairs as well as bench seats with armrests.

The airbag 20 may be of any suitable airbag material, e.g., from a woven polymer. For example, the airbag 20 may be formed of woven nylon yarn, e.g., nylon 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The airbag 20 may be a single continuous unit, e.g., a single piece of fabric. Alternatively, the airbag 20 may include a plurality of segments, i.e., two or more. The segments may be attached to each other in any suitable fashion, e.g., a plurality of panels attached by stitching, ultrasonic welding, etc.

Figure 4:
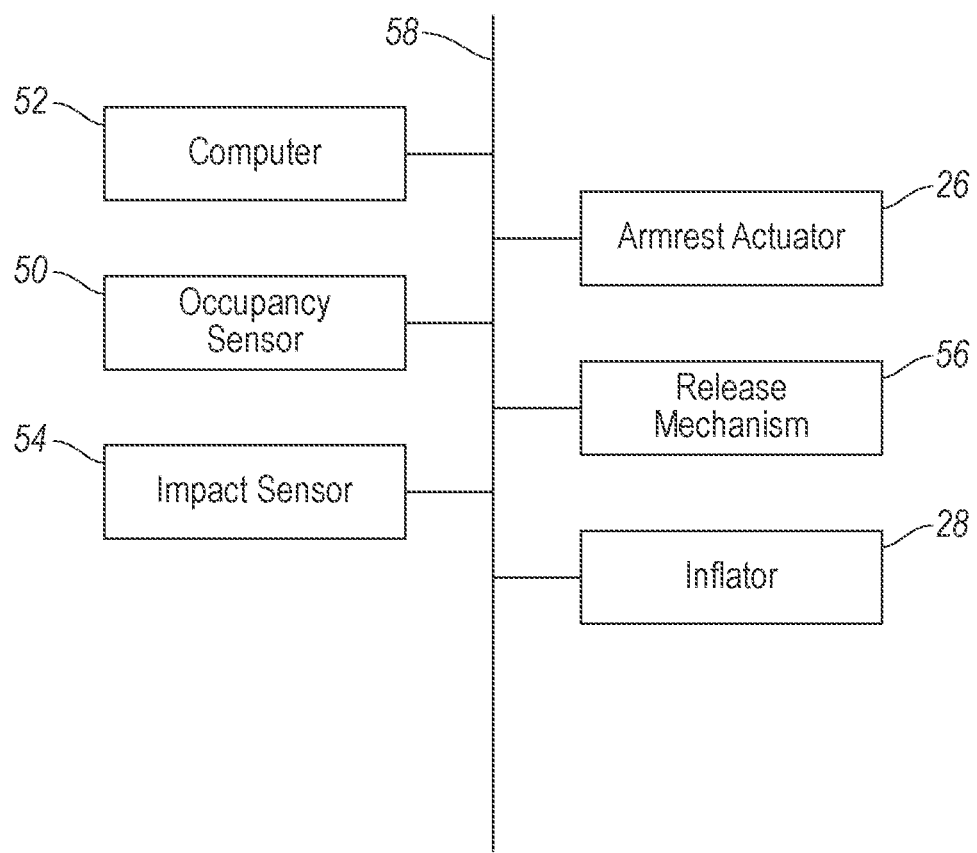
FIG. 4 is a block diagram of a system of the vehicle.

With reference to FIG. 4, the vehicle 10 may include at least one occupancy sensor 50. Specifically, the occupancy sensor 50 may be coupled to the seat 12 to identify whether a seated occupant is seated in the occupant seating area. The occupancy sensor 50 may be or be a part of an occupant classification system that classifies the seated occupant that is seated in the seat 12. For example, the occupancy sensors 50 may determine the size of the seated occupant. The occupancy sensor 50 may determine whether the seat 12 is occupied by a child restraint system. The occupant sensors may include cameras, weight sensors, etc. that determine and classify occupants of the seats 12. The size of the occupant may be defined as the height, weight, or other relevant physical characteristics of the occupant that may be included in size measurements. The occupancy sensor 50 may be in communication with the vehicle computer 52.

The vehicle 10 may include at least one impact sensor 54 for sensing certain vehicle impacts (e.g., impacts of a certain magnitude, direction, etc.), and a vehicle computer 52 in communication with the impact sensor 54, occupancy sensor 50, armrest actuator 26, release mechanism 56, and the inflator 28. The vehicle computer 52 may activate the inflator 28, e.g., provide an impulse to a pyrotechnic charge of the inflator 28, when the impact sensor 54 senses certain vehicle impacts. Alternatively or additionally to sensing certain vehicle impacts, the impact sensor 54 may be configured to sense certain vehicle impacts prior to impact, i.e., pre-impact sensing. The impact sensor 54 is configured to detect certain vehicle impacts. In other words, a "certain vehicle impact" is an impact of the type and/or magnitude for which inflation of the airbag 20 is designed i.e., "certain" indicates the type and/or magnitude of the impact. The type and/or magnitude of such "certain vehicle impacts" may be pre-stored in the computer 52, e.g., a restraints control module and/or a body control module. The impact sensor 54 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 54 may be located at numerous points in or on the vehicle 10.

With continued reference to FIG. 4, the vehicle computer 52 includes a processor and a memory storing instructions executable by the processor. The memory includes one or more forms of non-transitory computer readable media, and stores instructions executable by the vehicle computer 52 for performing various operations, including as disclosed herein. The vehicle computer 52 may be a restraints control module. The vehicle computer 52 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 52 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 52.

The vehicle computer 52 is generally arranged for communications on a vehicle communication network 58 that can include a bus in the vehicle 10 such as a controller area network CAN or the like, and/or other wired and/or wireless mechanisms. Alternatively or additionally, in cases where the vehicle computer 52 actually comprises a plurality of devices, the vehicle communication network 58 may be used for communications between devices represented as the vehicle computer 52 in this disclosure. Further, as mentioned below, various controllers and/or sensors may provide data to the vehicle computer 52 via the vehicle communication network 58.

Figure 5:
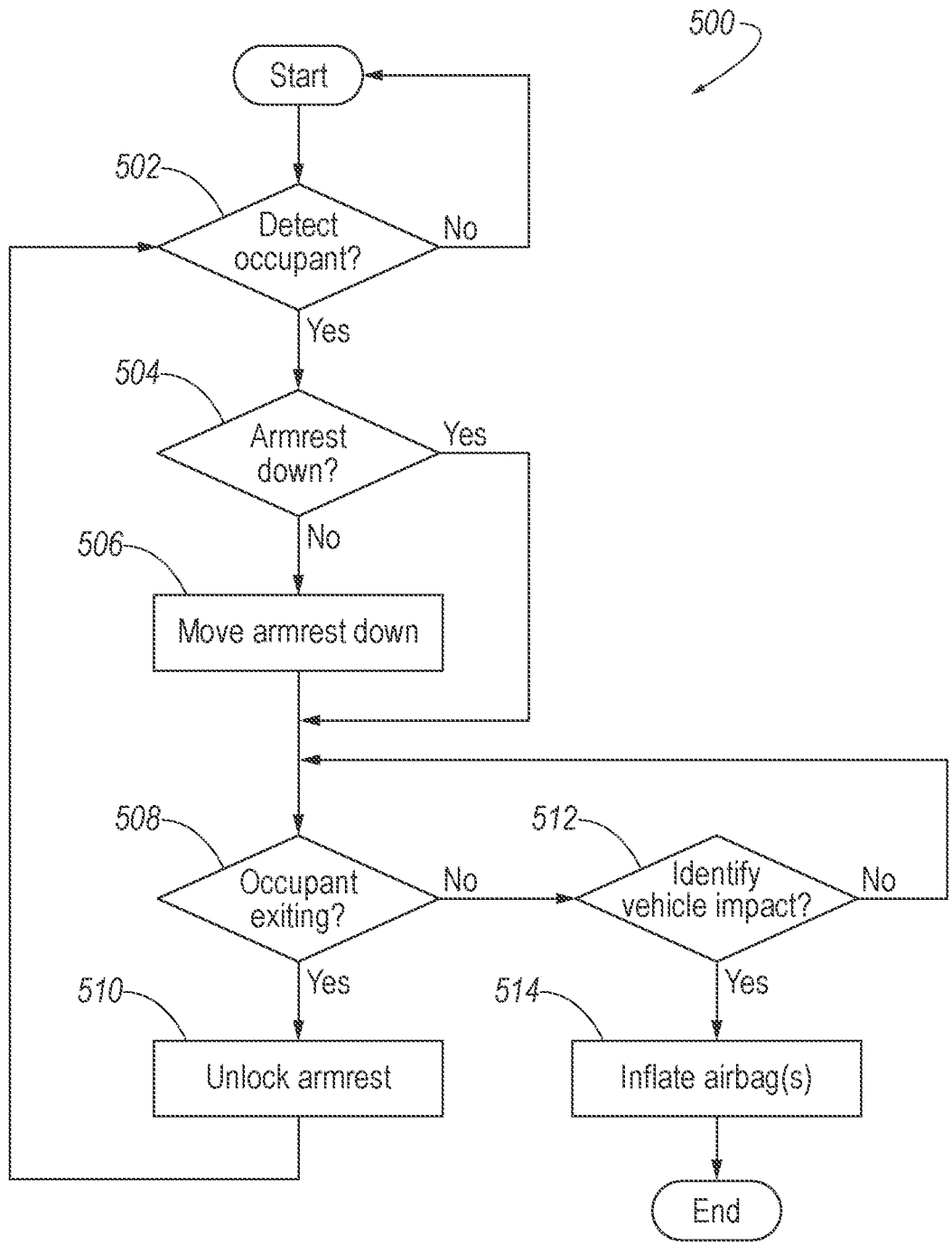
FIG. 5 is a flowchart of a method executable by a vehicle computer.

With reference to FIG. 5, the vehicle computer 52 stores instructions to control components of the vehicle 10 according to a method 500. Specifically, the method 500 includes moving the armrest 18 from the up position to the down position and, where applicable, unlocking the armrest 18. Any use of "based on" and "in response to" herein, including with reference to method 500, indicates a causal relationship, not merely a temporal relationship. Operations, systems, and methods described herein should always be implemented and/or performed in accordance with an applicable owner's/user's manual and/or safety guidelines.

With reference to decision block 502, the method 500 includes detecting occupancy of the seat 12 by a seated occupant. The occupancy sensor 50 may indicate to the vehicle computer 52 that a seated occupant is detected in the seat 12. If a seated occupant is detected, the method 500 moves to block 504. If no seated occupant is detected (e.g., the occupancy sensor 50 detects that no occupant is properly seated on the seat 12, the occupancy sensor 50 detects a child restraint system thus indicating that no occupant is in the seat 12, etc.), the method 500 returns to the start.

With reference to decision block 504, in response to detecting the seated occupant, the method 500 determines if the armrest 18 is in the down position. If the armrest 18 is determined to be in the down position, the method 500 moves to block 508. If the armrest 18 is not determined to be in the down position (e.g., the armrest is in the up position or somewhere in-between the up position and the down position), the method 500 moves to block 506. At block 506 the vehicle computer 52 may send a signal to the armrest actuator 26 to move the armrest 18 toward the down position. Moving the armrest 18 toward the down position may include engaging the worm drive by engaging the clutch on the worm wheel.

With respect to decision block 508, the method 500 includes determining whether the occupant is exiting the seat 12. In some examples, the occupant may indicate manually that the occupant is exiting the seat 12, e.g., by activating a button or switch supported by any suitable component of the vehicle 10, such as the seat 12 or an instrument panel. In other examples, sensors may indicate that the occupant is exiting the seat 12, e.g., by cameras, weight sensors, door sensors, etc. In response to determining the occupant is exiting the seat 12, the method 500 moves to block 510. If the occupant is not determined to be exiting the seat 12, the block moves to block 512.

At block 510, the method 500 includes unlocking the armrest 18 so that an occupant can manually move the armrest 18 from the down position to the up position. The vehicle computer 52 can activate the release mechanism 56 (e.g., disengage the clutch on the worm wheel) based on decision block 508. In other examples the armrest 18 can be unlocked manually by pushing a button on the armrest 18, for example. After the armrest 18 is unlocked, the method 500 returns to decision block 502 to identify whether an occupant is seated in the seat 12.

With respect to decision block 512, in response to determining the occupant is not exiting the vehicle 10, the method 500 includes identifying whether an impact has occurred to the vehicle 10. In the event of an impact, the impact sensors 54 communicate the occurrence of the impact to the computer 52. If an impact is identified, the method 500 moves to block 514. If no impact is identified, the method 500 returns to decision block 508 to determine whether the occupant is exiting the seat 12.

With respect to block 514, the method 500 includes inflating the airbag 20 to the inflated position. The inflator 28 passes inflation medium through the fill tubes 30 to inflate the airbag 20 to the inflated position. The method 500 ends after the inflation of the airbag 20.

The disclosure has been described in an illustrative manner, and it is to be understood that the terminology which has been used is intended to be in the nature of words of description rather than of limitation. The numerical adverbs "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. A vehicle seat, comprising:
a seatback defining an occupant-seating area;
an armrest coupled to the seatback; and
an airbag positioned in the armrest and inflatable from an uninflated position to an inflated position on a lateral side of the occupant-seating area, the airbag including:
a first chamber positioned to extend downward from the armrest; and
a second chamber positioned to extend upward from the armrest when the airbag is in the inflated position.

2. The vehicle seat as set forth in claim 1, wherein the armrest is rotatably coupled to the seatback.

3. The vehicle seat as set forth in claim 2, further comprising an actuator coupled to the armrest and operative to automatically move the armrest to a down position.

4. The vehicle seat as set forth in claim 3, wherein the actuator comprises a motor and a worm gear.

5. The vehicle seat as set forth in claim 3, wherein the first chamber and the second chamber at least partially overlap each other when in the inflated position.

6. The vehicle seat as set forth in claim 1, wherein the first chamber and the second chamber at least partially overlap each other when in the inflated position.

7. The vehicle seat as set forth in claim 6, wherein at least one of the first chamber and the second chamber includes at least one vent.

8. The vehicle seat as set forth in claim 1, wherein the first chamber and the second chamber are rolled in the uninflated position.

9. The vehicle seat as set forth in claim 1, further comprising an inflator fixed to the seatback and in fluid communication with the airbag.

10. The vehicle seat as set forth in claim 9, further comprising a fill tube extending from the inflator to the airbag.

11. A vehicle seat, comprising:
a seat bottom defining an occupant leg area;
a seatback supported by the seat bottom and defining an occupant torso area;
an armrest coupled to the seatback; and
an airbag positioned in the armrest and inflatable from an uninflated position to an inflated position on a lateral side of the occupant torso area, the airbag including:
a first chamber positioned to extend downward from the armrest between the occupant leg area and the armrest; and
a second chamber positioned to extend upward from the armrest adjacent to the occupant torso area when the airbag is in the inflated position.

12. The vehicle seat as set forth in claim 11, wherein the armrest is rotatably coupled to the seatback and further comprising an actuator coupled to the armrest and operative to automatically move the armrest to a down position.

13. The vehicle seat as set forth in claim 12, wherein the actuator comprises a motor and a worm gear.

14. The vehicle seat as set forth in claim 11, wherein the first chamber and the second chamber are rolled in the uninflated position.

15. The vehicle seat as set forth in claim 11, wherein the first chamber and the second chamber at least partially overlap each other when in the inflated position.

16. The vehicle seat as set forth in claim 11, wherein at least one of the first chamber and the second chamber includes at least one vent.

17. The vehicle seat as set forth in claim 11, further comprising an inflator fixed to the seatback and in fluid communication with the airbag.

18. The vehicle seat as set forth in claim 17, further comprising a fill tube extending from the inflator to the airbag.

19. The vehicle seat as set forth in claim 11, further comprising an inflator in fluid communication with both the first chamber and the second chamber and operative to fill both the first chamber and the second chamber.

* * * * *